J. W. WATSON.
MULTIPLE CONNECTING ROD ASSEMBLY.
APPLICATION FILED JUNE 15, 1915.
1,286,851.
Patented Dec. 3, 1918.
2 SHEETS—SHEET 2.
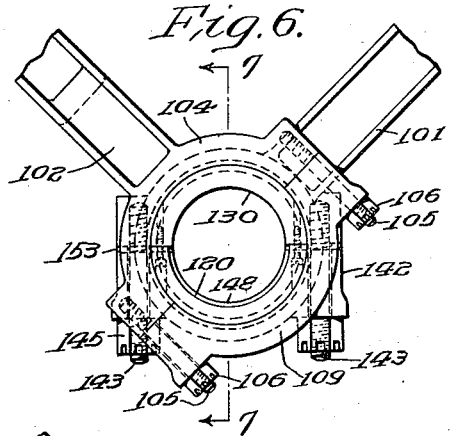
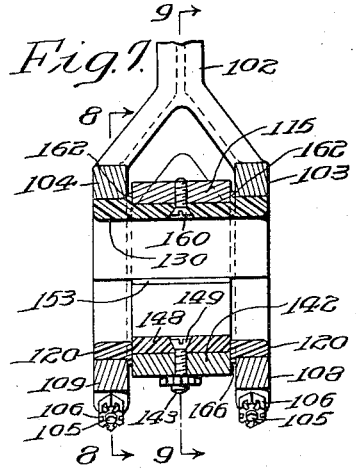
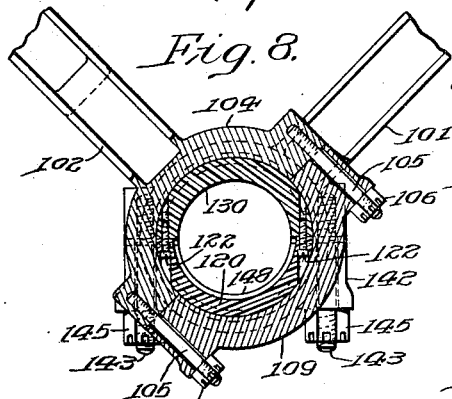
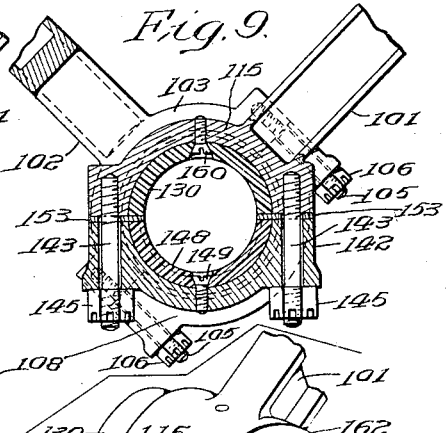
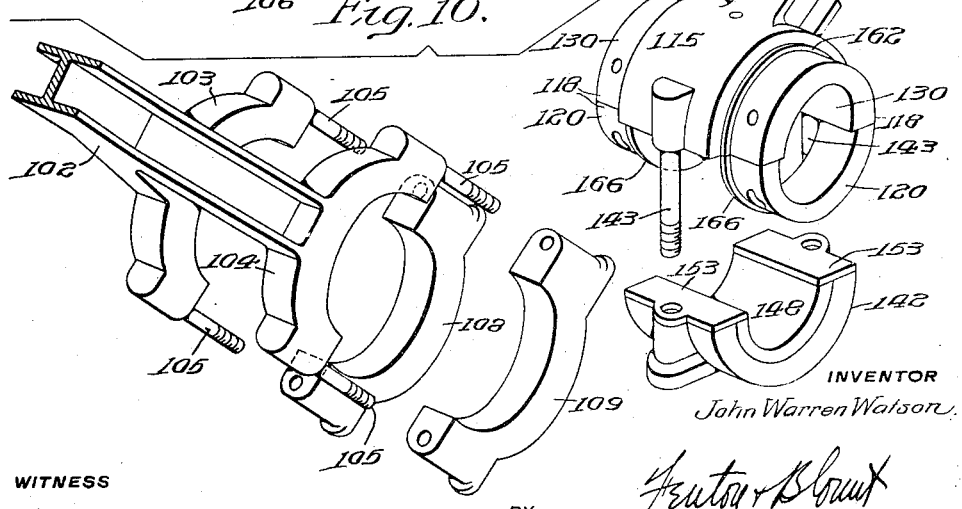
INVENTOR
John Warren Watson.
WITNESS
BY
ATTORNEYS

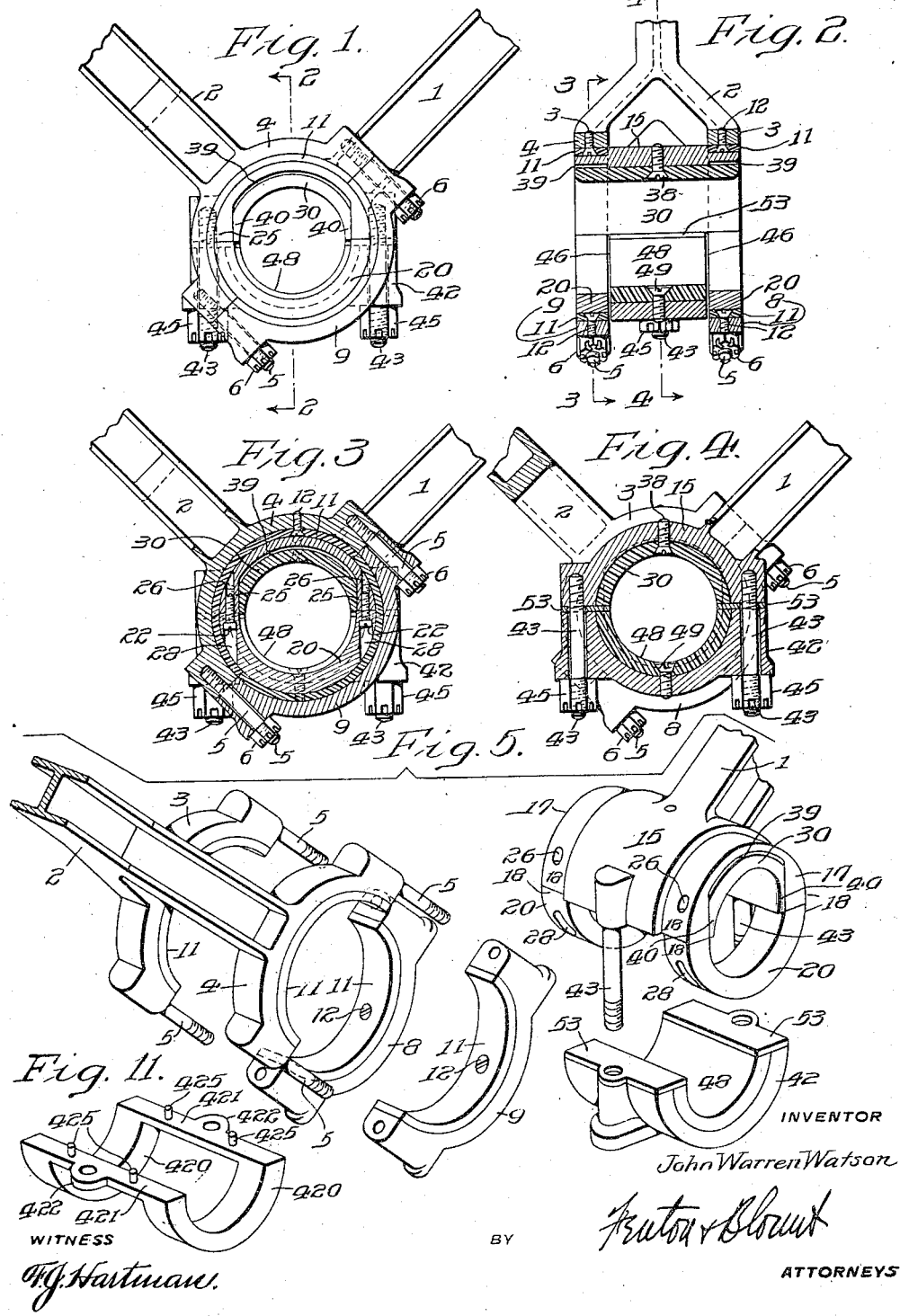

UNITED STATES PATENT OFFICE.

JOHN WARREN WATSON, OF WAYNE, PENNSYLVANIA.

MULTIPLE-CONNECTING-ROD ASSEMBLY.

1,286,851.      Specification of Letters Patent.      Patented Dec. 3, 1918.

Application filed June 15, 1915. Serial No. 34,318.

*To all whom it may concern:*

Be it known that I, JOHN WARREN WATSON, a citizen of the United States, and a resident of Wayne, county of Delaware, State of Pennsylvania, have invented certain new and useful Improvements in Multiple-Connecting-Rod Assemblies, of which the following is a specification, reference being had to the accompanying drawings.

My invention relates to bearing assemblies for multiple connecting rods arranged to exert power impulses upon a single crank pin or to be driven from a single crank pin, and is especially adapted for use in internal combustion motors in which a plurality of cylinders are arranged longitudinally of a single crank shaft, the axes of the cylinders being in angular relation with each other, Internal combustion motors of this type, known as "V-type" motors, have recently come into very general use in marine, aeroplane and automobile practice, it being customary in such motors to so arrange the cylinders with respect to a single crank shaft that the power impulses in any given pair of cylinders having their longitudinal axes in angular relation, may be transmitted by means of suitable pistons and connecting rods to exert rotative force upon a single crank pin. It therefore becomes necessary to provide a suitable bearing in which the crank pin may rotate with respect to the connecting rods, and also to provide suitable bearing surfaces to permit of a relative oscillation between each pair of rods, and in motors as at present constructed widely dissimilar means have been utilized to accomplish this result. In one construction employed, two independent connecting rods of ordinary type are arranged side by side and longitudinally of the crank pin, the axes of the connecting rods being correspondingly longitudinally off-set. This construction permits of the ready adjustment of the bearing surfaces in the ordinary manner, but is open to the objection that with a given length of crank pin the bearing surface of each rod thereon is necessarily reduced to about half of the area it would be possible to employ were but a single rod utilized, necessitating frequent adjustment. For the purpose of overcoming this objection another type of connecting rod bearing assembly has been devised, in which one of the rods is arranged to oscillate with respect to the other rod upon the exterior of a longitudinally split bearing-metal box fixed with respect to the other rod and surrounding the crank pin, which revolves therein. Thus a bearing surface substantially equal to the total superficial area of the crank pin is obtained, but this construction is open to the objection that any adjustment of this bearing surface to compensate for wear, necessarily distorts or changes the external contour of the box, so that after such adjustment has been made by removing the shims or liners from between the contacting edges of the halves of the bearing or by dressing off these edges in the well-known manner, the exterior surface of the box assumes an oval contour instead of a perfectly cylindrical one, destroying its usefulness as a bearing surface for the oscillating rod. Hence while in this type of bearing a maximum amount of bearing surface is obtained upon the crank pin to receive the impulses from the cylinders, the least wear between the parts entails the expense of entirely new bearing boxes, as well as the cost of disassembling the motor for the purpose of substituting them in place of the worn boxes, whereas in the type of bearing first described in which two rods are placed side by side upon the crank pin, although the bearing may be adjusted upon the occurrence of wear and without disassembling the whole motor, the bearing area of each rod is so materially reduced that with a given length of crank pin much more frequent adjustment is necessary than in a construction in which the maximum bearing surface is obtained.

A principal object, therefore, of my invention is to provide a multiple connecting rod assembly which shall combine the advantages of both types hitherto described and which shall possess none of the disadvantages of either as hitherto pointed out; which shall provide a maximum bearing surface for the crank pin, and in which either the crank pin bearing or the bearing upon which the relative oscillation of the connecting rods takes place may be adjusted as desired without permanently disturbing the contour or adjustment of the other bearing. Further objects of my invention are to provide a multiple connecting rod assembly having the foregoing characteristics which shall be adapted for use in the various types of motors at present employed in marine, aeroplane and automobile practice as well as in other motors and machinery; which may be constructed without a material increase in cost over the types of assemblies at present in use, and which may be readily assembled or adjusted without the use of special tools and by an ordinary mechanic.

My invention further includes all of the other various objects and novel features of construction and arrangement hereinafter more definitely specified.

In the accompanying drawings in Figures 1 to 5 inclusive, is illustrated one embodiment of my invention, Fig. 1 being a side elevation of the device in assembled position; Fig. 2, a central vertical section thereof taken on the line 2—2 in Fig. 1; Fig. 3, a transverse vertical section taken on the line 3—3 in Fig. 2, looking in the direction of the arrows; Fig. 4, a similar section taken on the line 4—4 in Fig. 2; also looking in the direction of the arrows, and Fig. 5 being a perspective view of the device disassembled and illustrating the various parts in their proper relation and ready for assembly. In Figs. 6 to 10 inclusive, is illustrated a slightly modified form of the invention, these figures corresponding to the figures illustrating the first form referred to. Fig. 11 is a detail perspective view of a slightly modified element applicale to certain forms of the invention.

Referring now more specifically to that form of the invention illustrated in Figs. 1 to 5 inclusive, a pair of connecting rods 1 and 2 are provided, the outer ends of which are suitably connected to pistons, not shown, through which the power impulse is transmitted to the rods or, in certain types of machinery, through which the power may be transmitted from a crank pin. The rod 2 is laterally forked adjacent its lower end and provided with a pair of downwardly projecting substantially semi-circular yokes 3 and 4, having their lower extremities preferably normal to the longitudnal axis of the rod, which are fitted with suitable threaded studs 5 for the reception of nuts 6 in the usual manner. A pair of substantially semicircular caps 8 and 9 corresponding to the yokes 3 and 4 are provided and arranged for the passage of the studs 5 so that they may be drawn upwardly against the lower ends of the yokes and retained in position thereon by the nuts 6. Within the yokes and their respective caps semi-circular bronze or other suitable bearing-metal liners 11 are provided, secured in fixed relation with the yokes by means of screws 12, dowels, or other suitable fastening means, the heads of the screws being countersunk beneath the surface of the liners, and the liners being so arranged that when the caps are in position upon the studs 5 the liners will form a substantially continuous internal bearing-metal lining within the yokes and caps.

The rod 1 adjacent its lower end is provided with a substantially semi-cylindrical boss 15 laterally extended on either side of the median line of the rod, the ends 17 being machined on their exterior surfaces to such a size as to form a snug working fit within the liners 11, and a pair of half rings 20 of steel or other suitable material are provided and arranged to be attached to the under surface of the boss adjacent either end by means of upwardly projecting screws 22 or other suitable devices in such manner that a smooth circular peripheral surface 18 may be formed at either end of boss 15 on rod 1, as clearly shown in Fig. 5, the radius of curvature of the exterior of rings 20 being equal to that of the outside of ends 17, and the radius of curvature of the interior being slightly greater than the radius of the crank pin on which the bearing is designed to operate, so as to provide a small clearance between the rings and the crank pin. The plane of the lower face of boss 15 may preferably be in angular relation with the longitudinal axis of rod 1, the angle depending upon the construction of the motor in which the rods are to be used and in practice being generally about 45 degrees.

The center portion of the interior of the boss is preferably machined on the arc of a circle of somewhat greater radius than the radius of the interior of rings 20, which are also preferably machined all over, and for the purpose of affording space in the boss for the reception of screws 22 which hold rings 20 in position thereon a pair of lugs 25 are left at either side of the boss sufficiently large to accommodate the threaded apertures 26 into which the screws or other fastening means project. It will be understood, of course, that other apertures 28 are provided in the surface of rings 20 to accommodate the heads of screws 22 so that they will not project above the surface of the rings.

Within boss 15 and extending laterally across the same is a bronze semi-cylindrical liner 30 hereafter referred to as the "brass", which may, if desired, be babbitt lined and provided with suitable oil grooves in the ordinary manner, neither the babbitt lining nor the grooves being shown in the drawings, however, for the sake of clearness. The interior diameter of the brass is such that it will form a good working fit about the crank pin of the motor and the brass is secured in position to boss 15 by means of an upwardly extending screw 38 or other fastening device, the head of which is countersunk below the interior surface of the brass.

As, owing to the inwardly projecting lugs 25 it is practically impossible to conveniently machine the entire interior of the boss as hereinbefore described, in practice the boss may be cast, or otherwise formed, so that its interior diameter adjacent its ends and for a width substantially equal to the width of lugs 25 is somewhat greater than the diameter of its finished center portion so that a slight clearance 39 will be left between the interior of the boss adjacent each of its ends and the exterior of brass 30, thus avoiding the necessity of turning down the interior of the boss adjacent its ends. The exterior diameter of the brass being substantially that of the interior diameter of the center portion of the boss it is necessary to mill off the exterior of the former, as at 40, adjacent it ends for the purpose of accommodating lugs 25 in order to permit the brass to seat snugly within the boss, but as the lugs are only at the most equal in width to the width of rings 20, it is unnecessary to mill off the brass as described except for a relatively short distance.

For the purpose of completing a cylindrical bearing for the crank pin and of holding the connecting rod 1 in operative relation therewith, a cap 42 of substantially the usual construction is provided, and arranged to be secured in operative relation with rod 1 by means of studs 43 secured in boss 15 and adapted to pass through suitable lugs upon the cap, nuts 45 serving to secure the cap in assembled position upon the studs. The width of cap 42 is slightly less than the distance between the inner faces of rings 20 so as to provide a slight clearance 46 on either side, and the cap is provided with an interior substantially semi-cylindrical bronze liner or brass 48 secured in position in the cap by means of a screw or other fastening means 49, the brass being provided with suitable oil grooves, not shown. Between the upper surface of this cap and the lower surface of the boss may be inserted a pair of suitable shims 53 in the usual manner, so that by decreasing the thickness of the shims the cap may be adjusted with respect to the crank pin when desired.

The various parts of this form of the invention having been constructed as hereinbefore described, the method of assembling the same, as clearly illustrated in Fig. 5, may be described as follows: The brass 30 being secured in boss 15 is placed in operative position upon the crank pin and cap 42 is then positioned over the lower half of the crank pin with shims 53 between its upper surface and the under surface of boss 15, the thickness of the shims being so adjusted that a snug working fit between the under face of brass 30 and the upper face of brass 48 is secured around the crank pin. The cap 42 being secured in position by means of nuts 45, half rings 20 are next positioned upon boss 15 and around the crank pin and secured in place by means of screws 25. In this position rings 20 will not contact with the surface of the crank pin, their interior diameter being greater than the diameter of the crank pin, as hitherto pointed out. The yokes 3 and 4 are then brought down upon surfaces 18 and caps 8 and 9 secured in position upon the studs by means of nuts 6. It will be evident that with the parts assembled as just described, the crank pin will be free to rotate within brasses 30 and 48, and rod 2 to oscillate with respect to rod 1 upon the surfaces 18 formed by the ends 17 of the boss and the rings 20 which complete a perfect circle. Owing to the rotation of the crank pin within the brasses the wear at this point is relatively great, necessitating periodic adjustment of the brasses, which may be readily accomplished by removing cap 42 and decreasing the thickness of shims 53, or dressing off the surface of cap 42 in the well-known manner in case no shims are utilized between the boss and the cap, so as to permit cap 42 to be moved vertically upward closer to boss 15, which adjustment may be readily made and the bearing surface brought to a perfect fit on the crank pin without in any manner disturbing the relation of liners 11 and surfaces 18 upon which they oscillate. In a similar way an adjustment of the liners with respect to surfaces 18 may be made without disturbing the adjustment of the crank pin bearing, but in practice it is found that owing to the relatively small movement of oscillation over surfaces 18 the wear at this point is practicably negligible so that the necessity of adjustment is very infrequent. However, it will be evident that no matter what relative position the adjustment of the crank pin bearing causes brasses 30 and 48 to assume the relation between liners 11 and the surfaces upon which they operate will remain undisturbed, and that in a similar manner the adjustment of liners 11 will in no way affect the bearing of the brasses upon the crank pin, so that either bearing may be adjusted when desired without permanently disturbing the adjustment of the other.

Referring now to the slightly modified form of the invention illustrated in Figs. 6 to 10 inclusive, and which correspond respectively to Figs. 1 to 5 inclusive, hereinbefore described, Fig. 6 is a side elevation of the device in assembled position; Fig. 7 a central vertical section thereof taken on the line 7—7 in Fig. 6, looking in the direction of the arrows; Fig. 8 a transverse vertical section taken on the line 8—8 in Fig. 7, looking in the direction of the arrows; Fig. 9 a similar section taken on the line 9—9 in Fig. 7, also looking in the direction of the arrows, and Fig. 10, corresponding to Fig. 5 hereinbefore referred to, is a perspective view of this form of the device disassembled and illustrating the various parts in their proper relation and ready for assembly.

In the form of the invention illustrated in said figures, connecting rods 101, 102 are provided, corresponding to rods 1 and 2 previously described. Rod 102 is laterally forked adjacent its lower end and provided with a pair of downwardly projecting substantially semi-circular yokes 103, 104, having their lower extremities preferably normal to the longitudinal axis of the rod, suitable threaded studs 105 for the reception of nuts 106 being fitted in the usual manner. Substantially semi-circular caps 108, 109, substantially similar to caps 8 and 9, are provided but no brass liners are secured within the caps as in the form of the invention previously described.

The rod 101 is provided adjacent its lower end with a substantially semi-cylindrical boss 115 laterally extended on either side of its median line and slightly less in width than the distance between the adjacent inner faces of the yokes 103, 104, the plane of the lower face of the boss being preferably in angular relation with the longitudinal axis of rod 101 in a manner similar to that previously described in connection with the form of the invention shown in Figs. 1 to 5 inclusive. The inner surface of this boss is preferably machined to a radius of curvature somewhat greater than that of the crank pin designed to rotate within the bearing assembly and a semi-cylindrical bearing-metal liner or brass 130 corresponding to brass 30 previously referred to, is secured within boss 115 by means of a screw 160 or other suitable fastening means, the head of the screw being countersunk below the inner surface of the brass. The internal radius of curvature of the brass is equal to the radius of the crank pin against which it its designed to bear, suitable oil grooves, not shown, being preferably provided in its surface.

The brass projects laterally on either side of boss 115 when secured therein and is machined all over, its exterior diameter adjacent its ends being preferably somewhat greater than the exterior diameter of its central portion, a pair of suitable outwardly directed flanges 162 being provided adjacent either side of boss 115 for the purpose of filling up the clearance space formed between the faces of the boss and the adjacent faces of yokes 103, 104 when the various parts are assembled, said flanges being clearly shown in Figs. 7 and 10. A pair of half rings 120 may be provided formed preferably of bronze or other suitable bearing-metal, and are arranged to be attached to the under surface of brass 130 adjacent either end thereof by means of upwardly projecting screws 122 or other suitable means, in such manner that a smooth circular peripheral surface 118 may be formed adjacent either end of brass 130, the material forming this surface, however, being bronze or other bearing metal in this form of the invention as distinguished from steel or other similar material in the form previously described. If desired, rings 120 may be provided adjacent their inner faces with outwardly directed flanges 166, corresponding to the flanges 162 previously described, the interior radius of curvature of rings 120, similar to that of rings 20, being preferably slightly greater than that of the crank pin on which the bearing is designed to operate in order to provide a small clearance between the rings and the crank pin.

In this form of the invention as brass 130 takes the place of brass 30 and the laterally extended machined portion of boss 15, it may be made relatively thicker in a bearing of given size, thus doing away with the necessity for lugs corresponding to lugs 25, there being sufficient inherent thickness in brass 130 itself to accommodate screws 122, by means of which rings 120 are secured in position.

For the purpose of completing the cylindrical bearing for the crank pin and of holding the connecting rod 131 in operative relation therewith, a cap 142 is provided substantially similar to cap 42 previously described, being arranged for engagement upon studs 143, nuts 145 serving to secure it in operative position thereon. The width of the cap may be such that it will fit nicely between flanges 166 when in position on studs 143, a substantially semi-cylindrical liner or brass 148 being positioned in the cap and secured therein by a screw 149 or other suitable fastening means, suitable oil grooves, not shown, being provided. Shims 153 are preferably inserted between the upper faces of the cap and the lower faces of the boss to permit of the relative adjustment of these parts by decreasing the thickness of the shims in the usual manner.

This form of the invention may be assembled in a manner substantially similar to that previously described in connection with the form illustrated in Figs. 1 to 5 inclusive, namely, by placing rod 101 carrying brass 130 over a crank pin and then adjusting cap 142 carrying brass 148 upon studs 143 by means of shims 153, so that a snug working fit may be secured around the crank pin. The rings 120 having been secured in position on brass 130, the yokes 103, 104 are brought down upon surfaces 118 and the caps 108, 109 secured on studs 105 by means of nuts 106, the caps and yokes being adjusted so as to secure a good working fit upon the surfaces 118. Of course, if desired, suitable shims may be employed between the adjacent faces of the caps and yokes, but with the parts properly constructed, the use of shims at this point may be dispensed with, and none are shown in the drawings.

It will be evident that with the parts assembled as just described the crank pin will be free to rotate within brasses 130 and 148 and rod 102 to oscillate with respect to rod 101 upon surfaces 118, and that the adjustment of brass 148 with respect to brass 130 to compensate for wear due to the rotation of the crank pin within the brasses may be accomplished without disturbing the relation of yokes 103 and 104 and the caps 108 and 109 or the contour of the surfaces upon which they oscillate, and that in a similar way the caps and yokes may be relatively adjusted without disturbing the adjustment of the surfaces contacting with the crank pin in a manner similar to that previously described in connection with the form of the device illustrated in Figs. 1 to 5 inclusive.

Fig. 11 is a perspective view of a slightly modified arrangement of the half rings 20, the modification consisting in permanently uniting the half rings 420 corresponding to half rings 20 and 120 by means of suitable bridges 421, said bridges being arranged to extend between the half rings and contact with the under faces of the boss 15 or 115 as the case may be, and being provided with suitably outwardly extending lugs 422 having apertures for engagement over studs 43 or 143. A plurality of upwardly extending dowels 425 or other suitable means may be provided adapted for engagement within suitable apertures formed in the under faces of the boss so that when the bridges are placed adjacent the boss with studs 43 or 143 passing through the apertures in the bridges the half rings will be fixedly positioned with regard to the boss, in which position the rings will be secured when the cap 42 or 142 is clamped upon the studs. Or, if desired, the dowels or the like may be secured permanently in the boss and arranged to engage in suitable apertures in the bridge. Of course it will be evident that when this construction is utilized in place of the independent half rings secured to the boss by screws or other suitable means, it will be necessary to make the shims 53 or 153 somewhat thinner or to dress off the upper faces of the cap in order to accommodate the bridges between the faces of the cap or shims and the lower face of the boss and still secure a snug fit between the interior of the lower brass and the crank pin, and further, that in assembling this form of the invention that studs 43 or 143 must be passed through the apertures 422 before the cap is secured in position.

In the forms of the invention herein described it will be noted that the brasses forming the bearing for the crank pin are maintained in fixed relation with one of the rods, and that a forked rod is arranged for oscillation with respect to said brasses upon bearings substantially concentric with the bearing engaging the crank pin, the relative oscillation of the rods taking place about a common center. In certain other embodiments of the invention, which form the subject of a divisional application for U. S. Letters Patent, this arrangement is reversed, the brasses forming the crank pin bearing being arranged in fixed relation with a forked rod, and another rod being arranged between the forks for relative oscillation with respect to the brasses carried by the first-mentioned rod upon a bearing substantially concentric therewith, the relative oscillation of the rods occurring about a common center.

It will thus be evident that my invention provides a multiple connecting rod assembly in which the rods are arranged for relative movement about a common center, and in which a maximum bearing surface, commensurate with the length of the crank pin, is provided for the reception of the impulses transmitted to the crank pin from the cylinders so that the wear between the crank pin and the bearing surfaces on which it revolves is reduced to a minimum, and in which when it does become necessary to adjust either the crank pin bearing or the bearing upon which the relative oscillation of the rods takes place, proper adjustment of either bearing may be readily made without permanently disturbing or destroying the contour of the other bearing.

Furthermore, while for the purpose of making clear to those skilled in the art both the construction and operation of my invention, I have herein described and illustrated certain forms thereof with considerable particularity, I in no way desire or intend to thereby limit myself specifically thereto or to the exact construction and arrangement of the parts of the invention as herein illustrated and described, for various changes may be made in the details of construction and arrangement of the various parts and suitable modifications may be made to adapt the invention to the varying conditions encountered in practice without departing from the spirit and scope of the invention as defined in the appended claims.

Having thus described my invention, I claim and desire to protect by Letters Patent of the United States:

1. In a multiple connecting rod assembly, the combination with a plurality of connecting rods, of a bearing fixed with respect to one of said rods and adapted to engage the surface of a crank pin, and a bearing for another of said rods substantially concentric with said first-mentioned bearing, either of said bearings being adjustable without disassembling the other of said bearings.

2. In a multiple connecting rod assembly, the combination with a plurality of relatively movable connecting rods, of a bearing adapted to contact with a crank pin, and a second bearing fixed with respect to said first mentioned bearing and spaced from said crank pin upon which one of said rods is adapted to oscillate about a common center with respect to another of said rods, each of said bearings being separately adjustable independently of the assembled position of the parts of the other of said bearings.

3. In a multiple connecting rod assembly, the combination with a plurality of connecting rods arranged for relative oscillation about a common center, of a bearing adapted to engage a crank pin, and a second bearing substantially concentric with said first mentioned bearing and fixed with respect thereto upon which one of said rods is free to oscillate, each of said bearings being adjustable independently of the position of the parts of the other bearing.

4. In mechanism, the combination of a split bearing adapted to engage a crank pin, a plurality of connecting rods relatively movable about a common center, one of said rods being fixed with relation to said bearing, and a bearing adjacent said split bearing and fixed with respect thereto upon which another of said rods is free to oscillate, the relative position of the members of either bearing being capable of adjustment without changing the position of the members of the other of said bearings.

5. In mechanism, the combination with a plurality of connecting rods adapted to transmit impulses to a single crank pin, of a split bearing adapted to engage said crank pin, and a bearing substantially concentric with said split bearing and comprising a plurality of members upon which one of said rods is free to oscillate with respect to another of said rods about a common center, the relative position of the members of either bearing being capable of variation without disturbing the relative assembled position of the respective members of the other bearing.

6. In mechanism, the combination with a plurality of connecting rods adapted to relatively oscillate about a common center, of a bearing adapted to engage a crank pin, and another bearing fixed with respect to said first-mentioned bearing and upon which one of said rods is adapted to oscillate, either bearing being separately adjustable without disassembling the other bearing.

In witness whereof I have hereunto set my hand this 10th day of June, A. D. 1915.

JOHN WARREN WATSON.

Copies of this patent may be obtained for five cents each, by addressing the "Commissioner of Patents, Washington, D. C."